United States Patent
Hongming et al.

(10) Patent No.: US 7,583,766 B2
(45) Date of Patent: Sep. 1, 2009

(54) SYSTEM, AND ASSOCIATED METHOD, FOR UTILIZING BLOCK BLAST WITH PPIC IN A MIMO MULTICODE MC-CDMA SYSTEM

(75) Inventors: Zheng Hongming, Beijing (CN); Guan Hao, Beijing (CN)

(73) Assignee: Nokia Corporation, Espoo (FI)

( * ) Notice: Subject to any disclaimer, the term of this patent is extended or adjusted under 35 U.S.C. 154(b) by 636 days.

(21) Appl. No.: 11/149,933

(22) Filed: Jun. 10, 2005

(65) Prior Publication Data

US 2006/0280255 A1    Dec. 14, 2006

(51) Int. Cl.
*H03D 1/04* (2006.01)
(52) U.S. Cl. ............... 375/346; 370/208; 370/210; 375/347; 375/148; 375/316; 375/144; 375/348
(58) Field of Classification Search ............... 375/316, 375/346
See application file for complete search history.

(56) References Cited

U.S. PATENT DOCUMENTS

| | | | |
|---|---|---|---|
| 5,644,592 A * | 7/1997 | Divsalar et al. | 375/147 |
| 7,076,263 B2 * | 7/2006 | Medvedev et al. | 455/522 |
| 7,215,704 B2 * | 5/2007 | Fujii et al. | 375/232 |
| 7,302,018 B2 * | 11/2007 | Onggosanusi et al. | 375/340 |
| 2005/0157809 A1 * | 7/2005 | Yuk | 375/267 |
| 2005/0174932 A1 * | 8/2005 | Deng et al. | 370/208 |
| 2005/0185575 A1 * | 8/2005 | Hansen et al. | 370/208 |

OTHER PUBLICATIONS

Zouheir Rezki, et al. (Department of Electrical Engineering), "A Novel Parallel Detection Architecture for Modular MIMO Receivers", May 2004, pp. 1155-1158.
Gang Wu, et al. (National Mobile Communications Research Laboratory, Southeast University), "Advanced Detection Scheme for Multicode CDMA With V-Blast Architecture", Sep. 2002, pp. 1810-1814.
Huiqiang Zhou, et al. (Dept. of Eletronic Engineering, Tsinghua University), "A Novel SIC-PIC Iterative Detector With Turbo Code Under Multi-Path Rayleigh Fading MIMO Channel", Sep. 2004, pp. 1592-1596.

(Continued)

*Primary Examiner*—Shuwang Liu
*Assistant Examiner*—Lihong Yu
(74) *Attorney, Agent, or Firm*—Squire, Sanders & Dempsey L.L.P.

(57) ABSTRACT

A method for reducing interference in a MIMO MultiCode MC-CDMA system is disclosed wherein a BLAST algorithm is implemented over one block of correlation reception data $y^i$ and estimation channel values H of the correlation reception data $y^i$ to generate a group of temporary decision symbols C. One symbol, $C_k^i$, is selected having a maximum SNR value from the temporary decision symbols. The temporary decision symbols, C, other than the selected symbol, $C_k^i$, are combined with the estimated channel value H to recover a group of temporary interference signals over the selected symbol, $C_k^i$. The interference signals are subtracted from the correlation reception signal vector, $y^i$ to generate a corrected reception signal vector $y^{i+1}$, and a more accurate decision symbol $C_k^{i+1}$ is identified from the corrected reception signal vector $y^{i+1}$ and original estimation channel values. The foregoing steps are repeated for other symbols $C_k^i$.

13 Claims, 6 Drawing Sheets

OTHER PUBLICATIONS

Jia Shen, et al. (University of York, Dept. of Electronics), "Turbo Multiuser Receiver for Space-Time Turbo Coded Downlink CDMA", Apr. 2003, pp. 1099-1103.

Xu Jing, et al. (National Mobile Communications Research Lab, Southeast University—Nokia Mobile Phones), "Parallel Multistage Equalizer With Partial Decision Feedback for Layered Space-Time Frequency-Selective Channels", Sep. 2003, pp. 750-754.

International Search Report for International application No. PCT/IB2006/001473, filed Jun. 2, 2006.

* cited by examiner

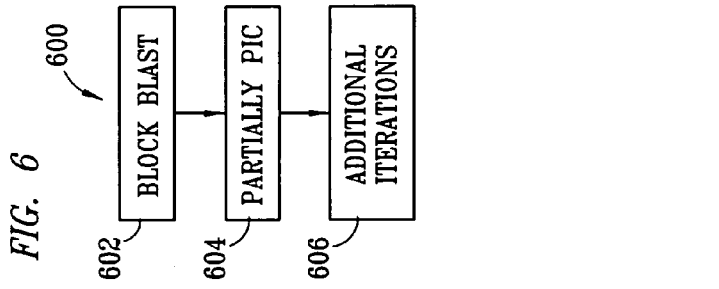

FIG. 6

$$S_m = \begin{bmatrix} s_{11} & s_{21} & \cdots & s_{P1} \\ s_{12} & s_{22} & \cdots & s_{P2} \\ & & \vdots & \\ s_{1J} & s_{2J} & \cdots & s_{PJ} \end{bmatrix}_{J \times PJ}$$

FIG. 4

$$H_m = \begin{bmatrix} h_{11} & h_{21} & \cdots & h_{N1} & & & & & & \\ & & & & h_{11} & h_{21} & \cdots & h_{N1} & & \\ h_{12} & h_{22} & \cdots & h_{N2} & & & & & & \\ & & & & h_{12} & h_{22} & \cdots & h_{N2} & & \\ & & \vdots & & & & \vdots & & & \vdots \\ h_{1J} & h_{2J} & \cdots & h_{NJ} & & & & & & \\ & & & & h_{1J} & h_{2J} & \cdots & h_{NJ} & & \\ & & & & & & & & h_{1J} & h_{2J} & \cdots & h_{NJ} \end{bmatrix}_{PJ \times NP}$$

FIG. 5

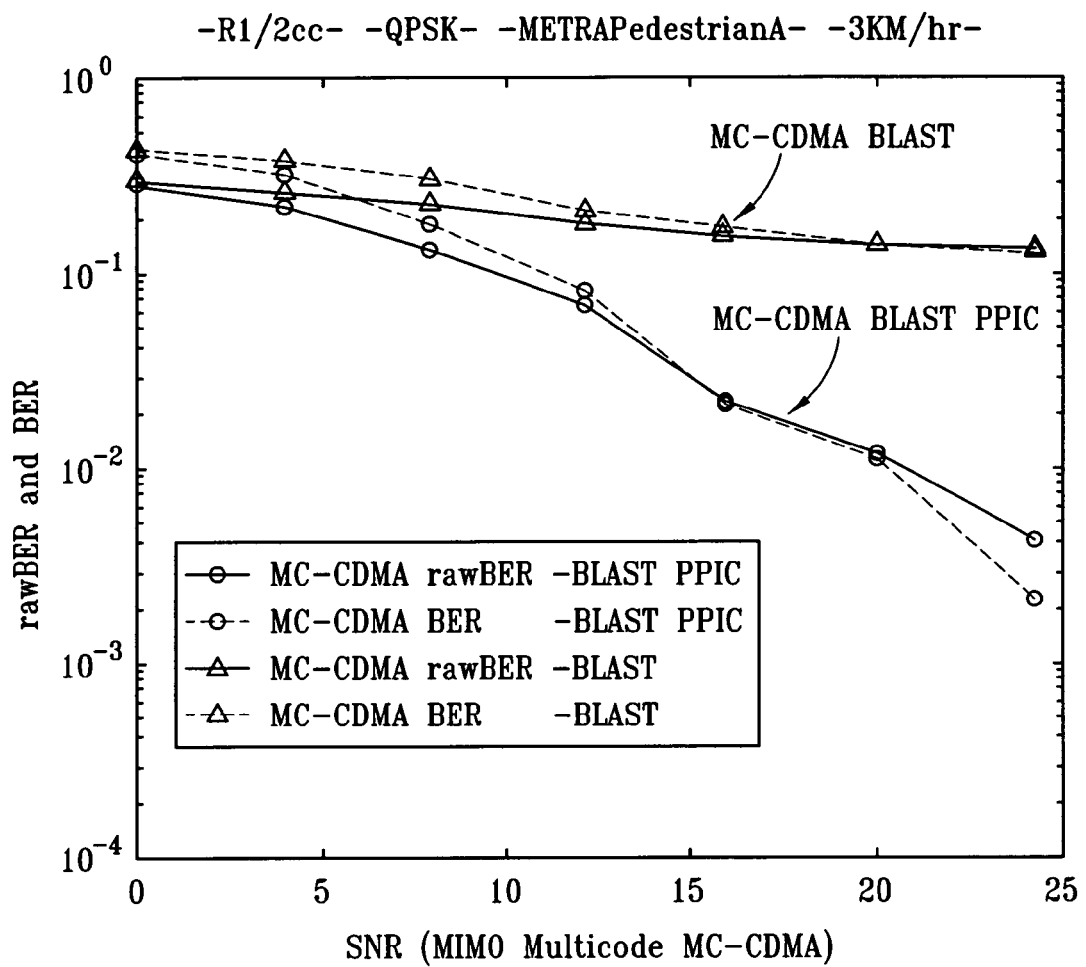

SYSTEM, AND ASSOCIATED METHOD, FOR UTILIZING BLOCK BLAST WITH PPIC IN A MIMO MULTICODE MC-CDMA SYSTEM

TECHNICAL FIELD

The invention relates generally to wireless telecommunications and, more particularly, to MIMO MultiCode MC-CDMA wireless telecommunications. Still more particularly, the invention relates to a system, and associated method, for utilizing block BLAST with Partially Parallel Interference Cancellation (PPIC) algorithm to reduce interference in a MIMO MultiCode MC-CDMA System.

BACKGROUND

Substantial research is being conducted in connection with MIMO OFDM to combine MIMO techniques with multicarrier (MC) schemes, it being understood that OFDM is but a special form of MC-CDMA. MIMO MC-CDMA is also being considered for the "4G" radio access scheme to provide the target data rate of the 4G system. In order to improve the system throughput in MIMO MC-CDMA, multicode transmission techniques are preferably incorporated into the system to provide the same information data rate as MIMO OFDM.

In order to provide the target data rate of the "4G" system, multicode transmission with MIMO technique is preferably combined simultaneously with MC-CDMA. However, under a multipath fading channel, MIMO Multicode MC-CDMA is problematic, because inherent in it are two interferences, namely, one from inter-code interference between the multicode under the multipath fading channel, and a second from inter-antenna interference caused from an independent stream of different antennas.

In mitigating the inter-code interference and inter-antenna interference, it is first noted that a relatively simple Bell Labs Space Time (BLAST) algorithm may be used in a MIMO (non-multicode) MC-CDMA system to distinguish the different TX-antenna streams, chip-by-chip. The aforementioned two interferences then provide the error floor performance. BLAST is described in further detail in U.S. Pat. No. 6,097,771 filed on Jul. 1, 1996, on behalf of Gerard J. Foschini and entitled "Wireless communications system having a layered space-time architecture employing multi-element antennas", in an article published in Bell Labs Tech. J., pages 41-59, Autumn 1996 by Gerard J. Foschini which was entitled "Layered space-time architecture for wireless communication in a fading environment when using multi-element antennas", in EP 0 817 401 A2, filed on Jul. 1, 1996, on behalf of Gerard J. Foschini and entitled "Wireless communications system having a layered space-time rchitecture employing multi-element antennas", and in EP 0 951 091 A2, filed on Apr. 15, 1998, on behalf of Gerard J. Foschini and Glenn D. Golden, and entitled "Wireless communications system having a space-time architecture employing multi-element antennas at both the transmitter and the receiver", all of which are incorporated herein by reference in their respective entireties.

Second, it is noted that, in contrast to MIMO MC-CDMA, in MIMO OFDM systems, there is only one interference from the independent stream of the different antennas, and the simple BLAST algorithm is effective for mitigating this inter-antenna interference.

Third, because MIMO OFDM has no spreading code, multicode is used, and as a consequence, there is no Multiple Access Interference (MAI) existing in MIMO OFDM systems. However, in a MIMO MC-CDMA system, additional interference is provided by the MAI caused by inter-code non-orthogonality.

In light of the foregoing, it is apparent that there is a need for a system and method which may be utilized to enhance the performance of the MIMO Multicode MC-CDMA system under a multipath fading channel. Such a system and method should, among other things, simultaneously mitigate both inter-code interference and inter-antenna interference.

SUMMARY

The present invention, accordingly, provides a block BLAST-like algorithm which includes a Partially Parallel Interference Cancellation (PPIC) algorithm effective for simultaneously mitigating the inter-code interference and inter-antenna interference of MIMO Multicode MC-CDMA systems. The BLAST algorithm and the PPIC algorithm are both used to differentiate the information stream between the inter-codes and inter-antennas, and ensure better performance of MIMO Multicode MC-CDMA systems under the multipath fading channel. Additionally, the block BLAST-like algorithm and PPIC techniques are combined to be used over one spreading-length block symbols.

For the multipath fading channel, MIMO Multicode MC-CDMA will have an error floor performance when a simple BLAST algorithm is used, chip-by-chip, to obtain a MIMO de-multiplexed symbol, and then the de-multiplexed symbols are despread and demodulated.

It is noted that the algorithm of the present invention has also taken into account the case of different channel information distributed in the different chips/subcarriers on MC-CDMA system, which is different from the general downlink CDMA case.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 exemplifies a spreading code matrix;

FIG. 5 exemplifies a channel matrix;

FIG. 6 depicts a high level flow chart illustrating control logic embodying features of the present invention for performing the BLAST-PPIC algorithm of FIG. 3;

FIG. 8 presents a performance chart of MIMO Multicode MC-CDMA system.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning BLAST, MIMO, MC-CDMA, and the like, have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
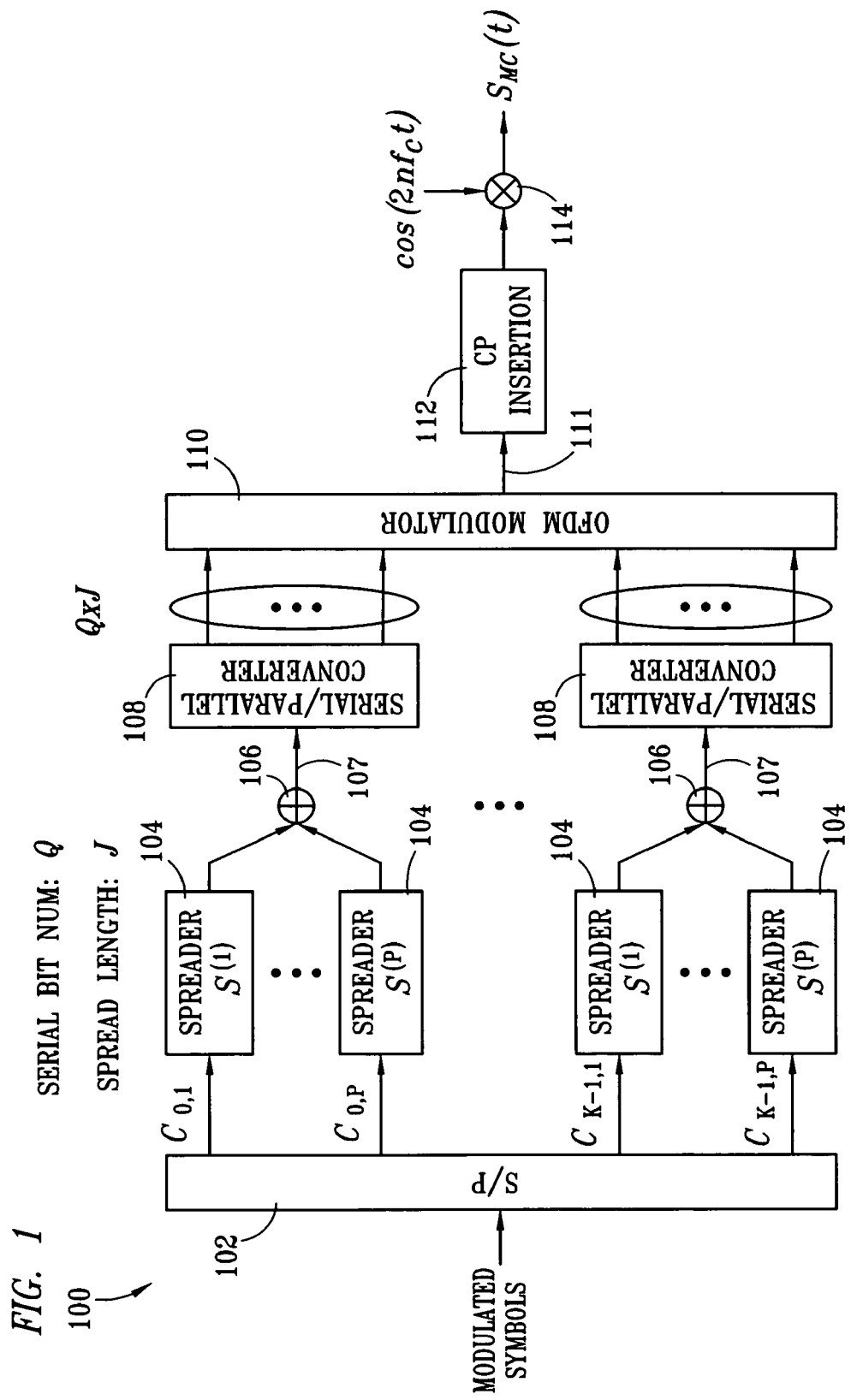
FIG. 1 presents a single transmitter antenna of a MIMO Multicode MC-CDMA system embodying features of the present invention.

Referring to FIG. 1 of the drawings, the reference numeral 100 generally designates a MIMO Multicode MC-CDMA system for a single transmitter antenna embodying features of the present invention. The system 100 includes a converter 102 configured for receiving modulated serial symbol streams of all users, and for converting the serial streams of symbols to K blocks of P streams of symbols. The converter 102 is coupled for transmitting the K blocks of P streams of symbols to K×P spreaders 104. Each spreader 104 is configured for spreading the streams using Walsh-Hadamard codes of length J. The length of the Walsh-Hadamard codes by vectors $S_1, \ldots, S_p$ is denoted as J and the length of symbol streams at the inputs of the kth block by vectors $C_{k,1}, \ldots, C_{k,P}$ is Q. Then the spread stream at the output of the spreaders 104 will be a vector of length QJ.

The spreaders 104 are coupled to K summers 106, each of which is configured for summing the vectors of length QJ to form a single spread stream. The summers 106 are each coupled to a serial-to-parallel converter 108 configured for converting and transmitting the serial stream to a parallel stream for an OFDM modulator 110. The OFDM modulator 110 inserts $N_p$ equally spaced pilot symbols into the stream to form the MC-CDMA block of $N_b$ symbols in the frequency domain, which is then converted to a time-domain MC-CDMA block using IFFT transformation.

The modulator 110 is preferably coupled via a line 111 to a cyclic prefix (CP) module 112 configured for using an IFFT to add a CP of appropriate length to the time-domain signal at the output of the OFDM modulator 110 to prevent ISI (Inter-Symbol Interference) and Inter-Channel Interference (ICI). The CP module 112 is coupled to a multiplexer 114 effective for modulating the stream output from the CP module 112 to IF (Intermediate Frequency) by a waveform of $\cos(2\pi f_c t)$. The signal is then transmitted over a multipath fading channel 208.

It may be appreciated that the modulated symbols in the branches 107 from the summers 106 to 108 are converted from serial to parallel, and then spread by different spreading codes and added and passed through one branch 111 for OFDM modulation, and then sent to a TX antenna, which constitutes a Multicode MC-CDMA system. In order to improve the data rate multiple antenna technique in accordance with principles of the present invention, MIMO is employed. The different information streams $C_{1,p}, \ldots, C_{N,p}$, are transmitted via different transmitter (TX) antennas ANT (1-N) 206, which may use the same or different spreading codes between TX-antennas, as discussed further below with reference to FIG. 2. After multicode spreading summation is performed for one TX-antenna, the data stream for each TX-antenna is converted from serial to parallel, OFDM-modulated, and then passed to TX-antenna for RF transmission.

Figure 2:
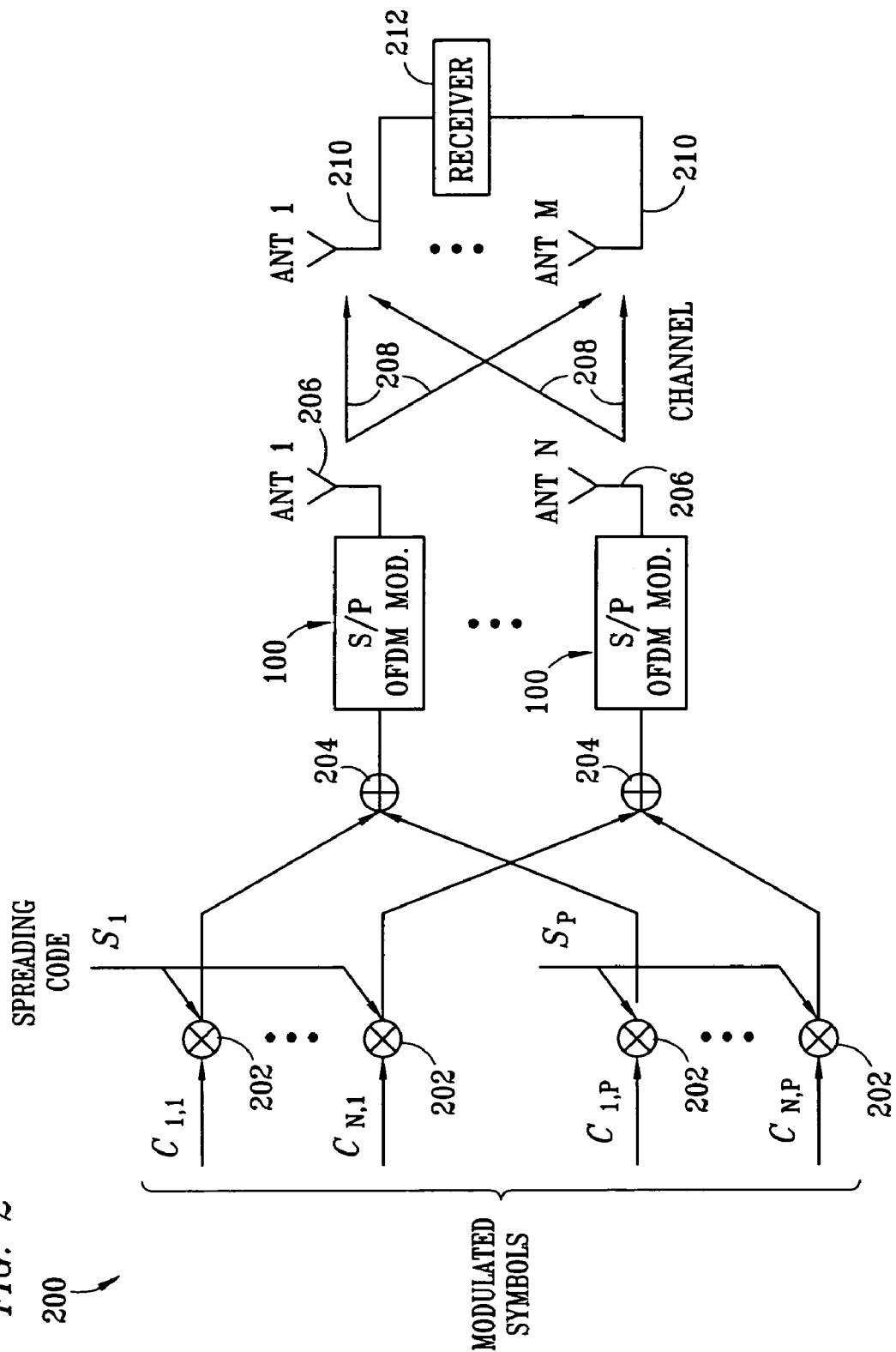
FIG. 2 presents a MIMO Multicode MC-CDMA transmitter system embodying features of the present invention.

FIG. 2 depicts a MIMO Multicode MC-CDMA transmitter system utilizing N transmit (TX) antenna systems 100. N multipliers 202 are configured for receiving modulated symbols, and multiplying the symbols by a spreading code. Each multiplier 202 is coupled to a respective summer 204 for summing the symbols from a respective antenna, and then transmitting the summed symbols to a TX antenna system 100, described above with respect to FIG. 1, including an antenna 206, coupled for transmitting the modulated symbols over an RF channel 208. As shown in FIG. 2 and described in further detail with respect to FIG. 3, M RX antennas 210 are configured for receiving the modulated symbols transmitted from the TX antennas 206, and are coupled for transmitting the received symbols to a receiver 212.

Figure 3:
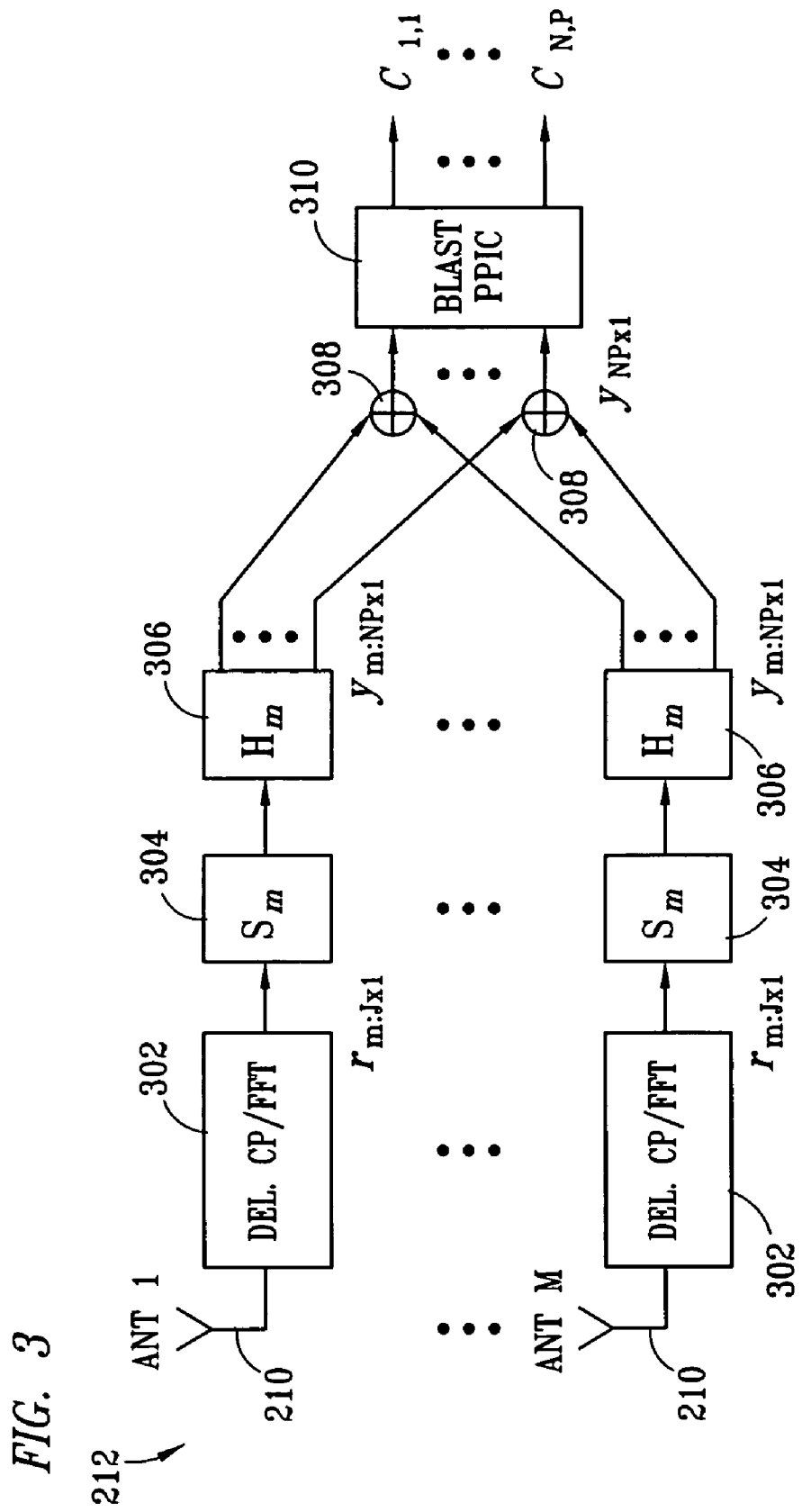
FIG. 3 presents a MIMO Multicode MC-CDMA receiver system utilizing a BLAST-PPIC algorithm in accordance with principles of the present invention.

FIG. 3 depicts details of the MIMO Multicode MC-CDMA receiver system 212 of FIG. 2. Each RX antenna 210 is coupled to a CP/FFT deletion module 302 configured for deleting the CP and FFT modulation from the data symbols received in each antenna 210. Each CP/FFT deletion module 302 is coupled to a spreading code matrix module 304, which in turn is coupled to a channel matrix module 306, configured for correlating the demodulated symbols with a spreading code matrix $S_m$ and a channel matrix $H_m$ to obtain a correlation reception vector $y_m$. The channel matrix modules 306 are coupled to summers 308 effective for adding the correlation reception vectors $Y_m$ from all antennas 210 to generate a whole correlation reception vector y. The summers 308 are coupled to a module 310 effective for implementing, in accordance with principles of the present invention, a BLAST-PPIC algorithm over the correlation reception vector y, to thereby recover the original transmission bits over the different antennas. It is noted that in the BLAST-PPIC algorithm, multicode interference is also regarded as being equivalent to inter-antenna interferences.

While the BLAST-PPIC algorithm is discussed in further detail below with reference to FIG. 7, it is summarized in FIG. 6 by a flow chart 600. Accordingly, in step 602, the BLAST algorithm is implemented over one block of correlation reception data $y^i$ and its estimation channel values H to generate a group of temporary decision symbols C, which may constitute information bits between inter-code distribution and inter-antenna distribution. Step 602 is described in further detail below with respect to steps 704 and 706 of FIG. 7. In step 604, one symbol, $C_k^i$, is selected having a maximum SNR value from the temporary decision values generated in step 602. By combining other temporary decision symbols, C, with the estimated channel value H, a group of temporary interference signals are recovered over the pre-selected symbol, $C_k^i$, and those interference signals are subtracted from the correlation reception signal vector, $y^i$. Then, from the corrected reception signal vector $y^{i+1}$ and original estimation channel values, a more accurate decision symbol $C_k^{i+1}$ is reached. In step 606, steps 602 and 604 are repeated for other symbols $C_k^i$, which may constitute the information bits between the inter-code distribution and inter-antenna distribution. In order to improve the symbol decision accuracy, additional iterations may be used. Steps 604 and 606 are described in further detail below with respect to steps 708-728 of FIG. 7.

A suitable reception signal vector y, a multicode spreading code matrix S, and an estimated channel value matrix H must be constructed where there is multipath fading, and also when different channel values are distributed on different chips within a single spreading code. In the block-like BLAST algorithm with PPIC, the two interferences, between inter-code and inter-antenna, are regarded as the same case.

In the MIMO Multicode MC-CDMA system it is assumed that the received signal at the receiver antenna m in the t-th chip is $r_{m,t}$. In the following equation (1), n designates the transmitter (TX) antenna index (N is maximum TX-antenna number), m designates the receiver (RX) antenna index (M is the maximum RX-antenna number), t denotes the chip index, J is the spreading code length, and P is the multicode number.

$$r_{m,t} = \sum_{n=1}^{N} h_{nmt} \sum_{p=1}^{P} C_{np} s_{pt} + \eta_{m,t} \quad (1)$$

$$t = 1 \wedge J$$

$$m = 1 \wedge M$$

where $s_{pt}$ is the t-th chip of the p-th spreading code; $h_{nmt}$ is the estimated channel information in the t-th chip at the transmitter antenna n and receiver antenna m and $C_{np}$ is the information bit transmitted at the n-th antenna and spread by the p-th spreading code and $\eta_{m,t}$ is AWGN noise on the t-th chip of m-th receiver antenna.

The received signal can be written in the following matrix form:

$$r_m = S_m H_m C + \eta_m \ m = 1 \wedge M \quad (2)$$

where $r_m$ is the reception signal vector at the receiver antenna m; $S_m$ is the spreading code matrix and $H_m$ is the estimated channel matrix; C is the transmission information data and $\eta_m$ is receiver noise.

In the MIMO multicode MC-CDMA system the spreading code matrix can be written as depicted in FIG. 4 under a multipath fading channel. FIG. 4 depicts how the spreading code matrix may be written, or how the channel matrix may be written.

The transmission information bit is:

$$C = [c_{11} \wedge c_{N1} c_{12} \wedge c_{N2} \wedge c_{1P} \wedge c_{NP}]^T \quad (3)$$

A channel correlation combination matrix for m-th receiver antenna may be constructed as:

$$R = \sum_{m=1}^{M} (S_m H_m)^H S_m H_m \quad (4)$$

By multiplying the received signal vector $r_m$ by spreading code matrix $S_m$ and channel matrix $H_m$, a new reception vector is reached:

$$y = RC + \bar{\eta} \quad (5)$$

where $$y = \sum_{m=1}^{M} (S_m H_m)^H r_m \quad (6)$$

and $$\bar{\eta} = \sum_{m=1}^{M} (S_m H_m)^H \eta_m$$

Figure 7:
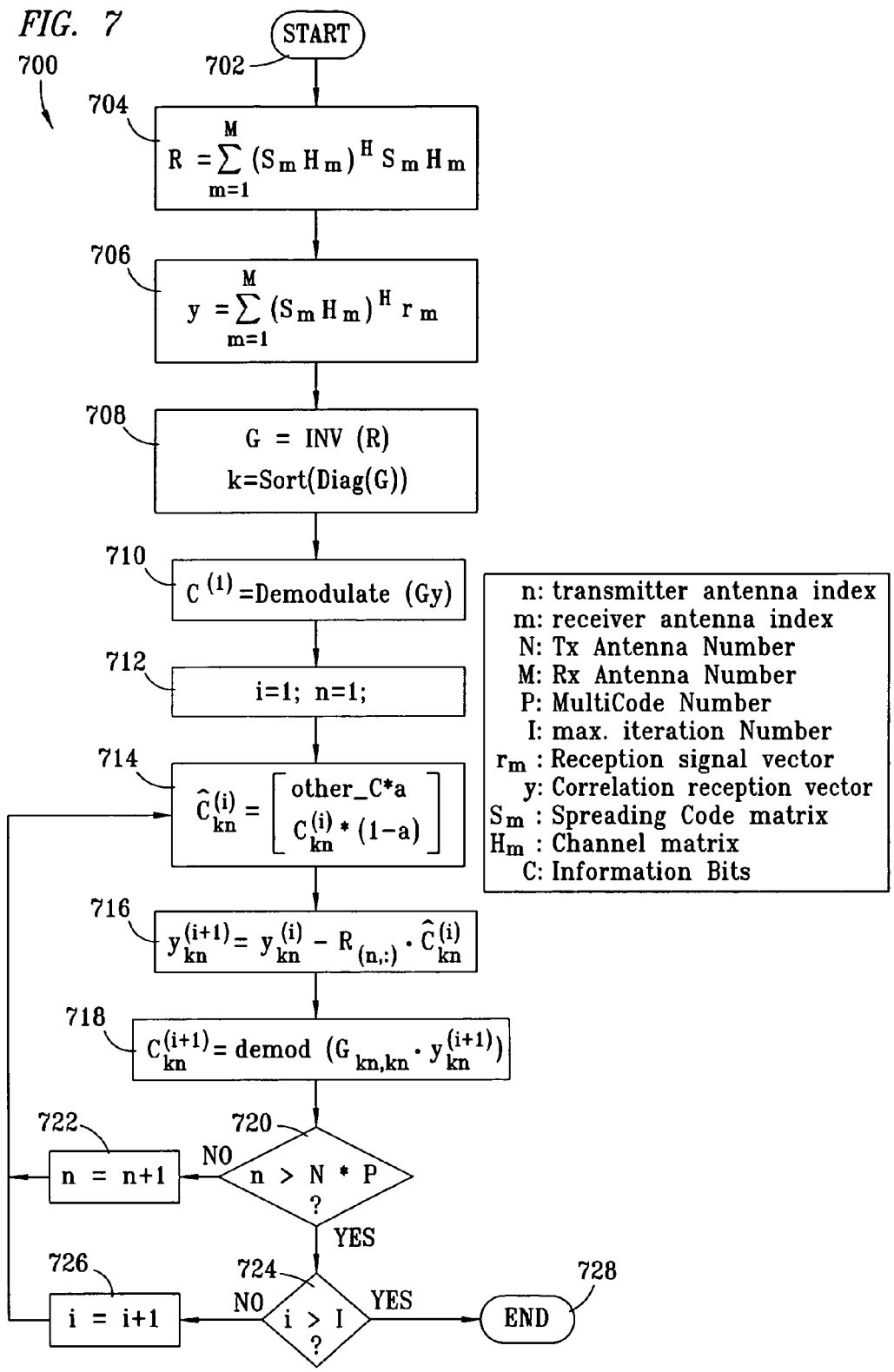
FIG. 7 depicts a flow chart illustrating in greater detail the control logic of FIG. 6.

FIG. 7 depicts a flow chart of control logic that may be utilized to implement the block BLAST-like algorithm with PPIC for the reception vector y and channel correlation combination matrix R.

Beginning in step 702 and proceeding to step 704, after OFDM demodulation by the OFDM module 110, the demodulated data $r_m$ is multiplied by the multicode spreading code matrix $S_m$ and estimated channel value matrix $H_m$ (FIGS. 4-5).

In step 706, the correlation reception vector y can be calculated by combining the reception correlation vector over all the receiver antennas (formula (6)). The reception vector y contains the inter-code interference and inter-antennas interference.

In steps 708-728, by using the correlation reception vector y, and channel combination matrix R, a block-like BLAST algorithm with partially parallel interference cancellation (PPIC) may recover the data information C between antennas and multicode information at the same time.

More specifically, in step 708, the pseudo-inverse value of the channel correlation matrix R is calculated, which value constitutes the multiplication summation between the spreading code matrix $S_m$ and the channel matrix $H_m$ and its conjugation over all receiver antennas.

In step 710, by using the correlation reception vector y and channel correlation inverse matrix $G = R^{-1}$ the temporary hard-decision information $C = de \ mod(G \cdot y)$ between the antennas and multicode can be worked out, where the information between multicode is also regarded as the same as that between antennas. The channel correlation inverse matrix G is then sorted by the ascending index of diagonal value of the channel correlation matrix inverse G, the index vector k can be obtained. Steps 712-728 depict the temporary symbol recovery and interference cancellation from the reception vector.

In a first iteration of step 714, according to the index vector k, the temporary decision in this minimum index $k_n^i$ (or maximum SNR value) is multiplied with this symbol's channel vector and a suitable coefficient a to get a first vector; in addition the other symbols are multiplied with those symbol's channel value and a coefficient (1−a) to get a second vector. By combining the foregoing first and second vectors, the interference signal can be recovered by the combination vector.

In step 716, the correlation reception vector $y_{k_n}^i$ is reduced by the temporary recovered interference signal caused by other symbols on selecting the suitable coefficient a.

In step 718, demodulating this corrected reception vector $y_{k_n}^{i+1}$ with the $(k_n^i, k_n^i)$ diagonal position value of channel correlation inverse matrix G, a new decision symbol $C_{k_n}^{i+1}$ for this symbol is reached. Other indexed symbols are determined similarly in a first iteration of steps 714-718.

In steps 720-726, one or more determinations are made whether to execute additional iterations of steps 714-718 to improve the data detection correction.

In order to test the performance the BLAST-PPIC algorithm for MIMO Multicode MC-CDMA, a simulation has been performed. In this simulation, 8 Walsh code for Multicode was used, and the spreading length of each code is also 8. In the system, there are 2 TX-antennas and 2 RX-antennas for the MIMO transmission. There are 1536 subcarriers for the data transmission, and 100 subcarriers for pilot transmission in the system. The IFFT/FFT transformation point is 2048. The symbol modulation is QPSK. The channel condition is a METRA Pedestrian A 3 km/hr multipath fading channel.

FIG. 8 depicts results of the simulation of the BLAST algorithm for MIMO Multicode MC-CDMA and BLAST-PPIC for MIMO Multicode MC-CDMA. When BLAST is simply used for MIMO Multicode MC-CDMA, the system is not working normally and the interference caused by inter-code and inter-antenna's information will give the error floor performance. From this figure, the BLAST-PPIC algorithm can work well for MIMO Multicode MC-CDMA system and provide the better performance.

The system and method of the present invention results in a number of advantages over the prior art. For example, the BLAST-PPIC algorithm provides a solution for the joint use of multicode transmission and multiple transmitter and receiver antennas under a multipath fading channel; by using the algorithm disclosed herein, the error floor can be overcome. Furthermore, the invention considers the case of different channel information distributed on different chips, which is different from the general downlink CDMA case. Still further, the invention provides a representation of a spreading code matrix and a channel matrix, which two matrixes are considered the concept of chip-equalization. This is different from the case of a general CDMA system because, in general, a CDMA receiver will use a Rake reception which is a simplified case. This matrix formulation can provide the method for future work to continuously simplify and optimize (or sub-optimize) the MIMO Multicode MC-CDMA. In a further advantage, the BLAST-PPIC algorithm reduces the computation tasks of large numbers of the pseudo-inverse matrix in the simple BLAST algorithm; and there only exists one pseudo-inverse operation in the beginning of executing the algorithm, and others are only the multiplication and addition operation.

It is understood that the present invention may take many forms and embodiments. Accordingly, several variations may be made in the foregoing without departing from the spirit or the scope of the invention. For example, when the MIMO spatial multiplexing scheme is converted into a MIMO diversity scheme to be used in an MC-CDMA system, there are still multiple different interferences. The present invention may be employed to reduce such interferences, by first obtaining a single unified spreading channel matrix R and received correlated signal Y; and second by using the BLAST-PPIC algorithm to determine the original information bits. The invention may also be used to reduce interference induced from the use of multiple antennas over a large number of different multiple antenna schemes employed in an MC-CDMA system, to thereby increase the spectrum efficiency of the system.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method, comprising:
    implementing a bell labs space time algorithm over one block of correlation reception data $y^i$ and estimation channel values H of the correlation reception data $y^i$ to generate a group of temporary decision symbols C;
    selecting one symbol, $C^i_k$, having a maximum signal to noise ratio value from said temporary decision symbols;
    combining said temporary decision symbols, C, other than the selected symbol, $C^i_k$, with the estimation channel values H to recover a group of temporary interference signals over said selected symbol, $C^i_k$;
    subtracting said interference signals from said correlation reception data $y^i$ to generate a corrected reception signal vector $y^{i+1}$;
    identifying a more accurate decision symbol $C^{i+1}_k$ from the corrected reception signal vector $y^{i+1}$ and the estimation channel values; and
    repeating the above steps for other symbols $C^i_k$ {circumflex over k}, said operations being performed via a processor.

2. The method of claim 1, wherein said group of temporary decision symbols C constitute information bits between inter-code distribution and inter-antenna distribution.

3. The method of claim 1, wherein the identifying is performed with reference to the equation:

$$C^{(i+1)}_{kn} = \text{demod}(G_{(kn,kn)} \cdot y^{(i+1)}_{kn}),$$

wherein G is a channel correlation inverse matrix.

4. An apparatus, comprising:
    a plurality of cycle prefix fast Fourier transform deletion modules configured to delete the cycle prefix and fast Fourier transform modulation from the data symbols received on a respective antenna configured modulated symbols, to thereby generate demodulated data symbols;
    a plurality of spreading code matrix modules coupled to a respective cycle prefix fast Fourier transform deletion module to generate a spreading code matrix $S_m$ from said demodulated data symbols;
    a plurality of channel matrix modules coupled to a respective spreading code matrix module to generate a channel matrix $H_m$ and configured to correlate the demodulated symbols with said spreading code matrix $S_m$ and the channel matrix $H_m$ to obtain a correlation reception vector $y_m$; a plurality of summers coupled to each of said plurality of channel matrix modules to add the correlation reception vectors $y_m$ generated from each of said plurality of channel matrix modules to generate a whole correlation reception vector y; and
    a bell labs space time algorithm partially parallel interference cancellation module coupled to each of said plurality of summers to implement a bell labs space time algorithm partially parallel interference cancellation algorithm over the correlation reception vector y, to thereby recover original transmission bits over the different antennas, wherein said bell labs space time algorithm partially parallel interference cancellation algorithm further comprises,
    implementing the bell labs space time algorithm partially parallel interference cancellation algorithm over one block of correlation reception data $y^i$ and estimation channel values H of the correlation reception data $y^i$ to generate a group of temporary decision symbols C;
    selecting one symbol, $C^i_k$, having a maximum signal to noise ratio value from said temporary decision symbols; computer program code to combine said temporary decision symbols, C, other than the selected symbol, $C^i_k$, with the estimation channel values H to recover a group of temporary interference signals over said selected symbol, $C^i_k$;

subtracting said interference signals from said correlation reception data, $y^i$ to generate a corrected reception signal vector $y^{i+1}$;

identifying a more accurate decision symbol $C^{i+1}_k$ from the corrected reception signal vector $y^{i+1}$ and the estimation channel values; and repeating the above operations for other symbols $\hat{C}^i_k$ {circumflex over k}.

5. The system of claim 4, wherein said group of temporary decision symbols C constitute information bits between inter-code distribution and inter-antenna distribution.

6. The system of claim 4, wherein said identifying is performed with reference to the equation:

$$C^{(i+1)}_{kn} = \mathrm{demod}(G_{(kn,kn)}, y^{(i+1)}_{kn}),$$

wherein G is a channel correlation inverse matrix.

7. A system, comprising:

a plurality of multiple input multiple output multi-carrier code division multiple access transmitter systems; and a multiple input multiple output multi-carrier code division multiple access receiver system utilizing a bell labs space time algorithm partially parallel interference cancellation algorithm, wherein said bell labs space time algorithm partially parallel interference cancellation algorithm further comprises, implementing the bell labs space time algorithm partially parallel interference cancellation algorithm over one block of correlation reception data $y^i$ and estimation channel values H of the correlation reception data $y^i$ to generate a group of temporary decision symbols C;

selecting one symbol $C^i_k$, having a maximum signal to noise ratio value from said temporary decision symbols;

combining said temporary decision symbols, C, other than the selected symbol, $C^i_k$, with the estimation channel values H to recover a group of temporary interference signals over said selected symbol, $C^i_k$;

subtracting said interference signals from said correlation reception data, $y^i$ to generate a corrected reception signal vector $y^{i+1}$; computer program code to identify a more accurate decision symbol $C^i_k$ from the corrected reception signal vector $y^{i+1}$ and the estimation channel values; and repeating the above operations for other symbols $\hat{C}^i_k$ {circumflex over k}.

8. The system of claim 7, wherein each of said multiple input multiple output multi-carrier code division multiple access transmitter systems further comprises:

a converter configured to receive modulated serial symbol streams, and to convert said serial streams of symbols to K blocks of P streams of symbols; K×P spreaders coupled to said converter to receive K blocks of P streams of symbols from said converter, and configured to spread said P streams of symbols using Walsh-Hadamard codes to thereby form a vector; K summers, each of which is coupled to P spreaders, and is configured to sum said vectors from said P spreaders to thereby form a single spread stream;

a serial-to-parallel converter coupled to each of said summers to convert said single spread stream to a parallel spread stream; and an orthogonal frequency division multiplexing modulator coupled to said serial-to-parallel converter to receive said parallel spread stream and to insert $N_p$ equally spaced pilot symbols into said parallel stream to form multi-carrier schemes block of $N_b$ symbols in the frequency domain, and to use an inverse fast fourier transform transformation to convert said multi-carrier code division multiple access block in the frequency domain to an multi-carrier code division multiple access block in the time-domain; and a multiplexer coupled to said orthogonal frequency division multiplexing modulator to modulate said stream output from said orthogonal frequency division multiplexing modulator to intermediate frequency by a waveform of $\cos(2\pi f_c t)$.

9. The system of claim 7, wherein each of said multiple input multiple output multicode multi-carrier code division multiple access transmitter systems further comprises:

a converter configured to receive modulated serial symbol streams, and to convert said serial streams of symbols to K blocks of P streams of symbols;

K×P spreaders coupled to said converter to receive K blocks of P streams of symbols from said converter, and configured to spread said P streams of symbols using Walsh-Hadamard codes to thereby form a vector;

K summers, each of which is coupled to P spreaders, and is configured to sum said vectors from said P spreaders to thereby form a single spread stream;

a serial-to-parallel converter coupled to each of said summers to convert said single spread stream to a parallel spread stream; an orthogonal frequency division multiplexing modulator coupled to said serial-to-parallel converter to receive said parallel spread stream and to insert $N_p$ equally spaced pilot symbols into said parallel stream to form multi-carrier code division multiple access block of $N_b$ symbols in the frequency domain, and to use an inverse fast fourier transform transformation to convert said multi-carrier code division multiple access block in the frequency domain to multi-carrier code division multiple access block in the time-domain;

a cyclic prefix module coupled to the output of the orthogonal frequency division multiplexing modulator to use an inverse fast fourier transform to add a cyclic prefix to the time-domain signal at the output of the orthogonal frequency division multiplexing modulator to prevent inter-symbol interference and inter-channel interference; and a multiplexer coupled to said cyclic prefix module to modulate said stream output from said orthogonal frequency division multiplexing modulator to intermediate frequency by a waveform of $\cos(2\pi f_c t)$.

10. The system of claim 7, wherein said multiple input multiple output multi-carrier code division multiple access receiver system further comprises:

a plurality of cycle prefix fast fourier transform deletion modules configured to delete the cycle prefix and fast fourier transform modulation from the data symbols received on a respective antenna configured to receive modulated symbols, to thereby generate demodulated data symbols;

a plurality of spreading code matrix modules coupled to a respective cycle prefix fast fourier transform deletion module to generate a spreading code matrix $S_m$ from said demodulated data symbols;

a plurality of channel matrix modules coupled to a respective spreading code matrix module to generate a channel matrix $H_m$ and configured to correlate the demodulated symbols with said spreading code matrix $S_m$ and a channel matrix $H_m$ to obtain a correlation reception vector $y_m$;

a plurality of summers coupled to each of said plurality of channel matrix modules to add the correlation reception vectors $y_m$ generated from each of said plurality of channel matrix modules to generate a whole correlation reception vector y; and a bell labs space time algorithm partially parallel interference cancellation module coupled to each of said plurality of summers to implement a bell labs space time algorithm partially parallel interference cancellation algorithm over the correlation reception vector y, to thereby recover original transmission bits over the different antennas.

11. The system of claim 7, wherein said group of temporary decision symbols C constitute information bits between inter-code distribution and inter-antenna distribution.

12. The system of claim 7, wherein said identifying is performed with reference to the equation:

$$C^{(i+1)}_{kn} = \text{demod}(G_{kn,kn} \cdot y^{(i+1)}_{kn}),$$

wherein G is a channel correlation inverse matrix.

13. A computer program embodied on a computer readable medium, said computer program configured to control a processor to perform:

implementing a bell labs space time algorithm over one block of correlation reception data $y^i$ and estimation channel values H of the correlation reception data $y^i$ to generate a group of temporary decision symbols C;

selecting one symbol, $C^i_k$, having a maximum signal to noise ratio value from said temporary decision symbols;

combining said temporary decision symbols, C, other than the selected symbol, $C^i_k$, with the estimation channel values H to recover a group of temporary interference signals over said selected symbol, $C^i_k$;

subtracting said interference signals from said correlation reception data, $y^i$ to generate a corrected reception signal vector $y^{i+1}$;

identifying a more accurate decision symbol $C^{i+1}_k$ from the corrected reception signal vector $y^{i+1}$ and the estimation channel values; and repeating the above operations using other symbols $C^i_k\{\text{circumflex over k}\}$.

* * * * *